(12) United States Patent
Tormaschy et al.

(10) Patent No.: US 6,439,853 B2
(45) Date of Patent: *Aug. 27, 2002

(54) WATER CIRCULATION APPARATUS AND METHOD

(75) Inventors: Willard Richard Tormaschy, Dickinson, ND (US); Wayne Everet Ruzicka, 1300 N. 3rd St., Bismarck, ND (US) 58501; Joel John Bleth, Dickinson, ND (US); Gary Allen Kudrna, Dickinson, ND (US); Tait Joseph Obritsch, Fairfield, ND (US)

(73) Assignees: PSI-ETS and Partnership, Dickinson, ND (US); Wayne Everet Ruzicka, Bismarck, ND (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,736

(22) Filed: May 20, 1999

Related U.S. Application Data

(60) Provisional application No. 60/086,285, filed on May 21, 1998.

(51) Int. Cl.[7] ................................................ F04B 53/00
(52) U.S. Cl. ..................... 417/53; 417/61; 417/423.9; 210/170; 210/242.2
(58) Field of Search .............................. 210/170, 242.2; 417/61, 423.9, 53

(56) References Cited

U.S. PATENT DOCUMENTS

| | | | |
|---|---|---|---|
| 3,204,768 A | 9/1965 | Daniel | 210/197 |
| 3,794,303 A | 2/1974 | Hirshon | 261/61 |
| 3,856,272 A * | 12/1974 | Ravitts | 259/95 |
| 4,030,859 A | 6/1977 | Henegar | 417/61 |
| 4,179,243 A | 12/1979 | Aide | 417/61 |
| 4,647,374 A * | 3/1987 | Ziaylek et al. | 210/242.1 |
| 4,657,675 A | 4/1987 | Zan | 210/170 |
| 4,906,359 A * | 3/1990 | Cox, Jr. | 210/170 |

FOREIGN PATENT DOCUMENTS

| | | |
|---|---|---|
| CA | 1262052 | 3/1989 |
| JP | 1147794 | 2/1999 |

OTHER PUBLICATIONS

Aeromix Systems, Incorporated brochure on Hurricane Submersible Aerator EcoEssence, Incorporated, EcoEddy brochure, Sep. 1997.
Otterbine Barebo, Inc. brochure, Nov. 1997.
Accel–o–Fac brochure, 1997.
Environmental Equipment Engineering, Inc. brochure, 1989.

* cited by examiner

Primary Examiner—Ehud Gartenberg
(74) Attorney, Agent, or Firm—Curtis V. Harr

(57) ABSTRACT

This circulation device is equipped with a water impeller that is larger than and tightly fitted over the top of the draft tube through which the water from the pond or reservoir is drawn. By placing the impeller above and out of the draft tube it enables to lift water through the draft tube and imparts a centrifugal force on the water above the impeller which aids in moving the water radially outward from the impeller. The water is directed outwardly over a large diffuser plate that is centrally located. The outer edge of the diffuser plate is equipped with a laminar flow diffuser lip which is designed to inhibit the passage of water from the diffuser plate to the open water. This design ensures that most of the energy imparted to the water by the impeller is retained once it leaves the diffuser plate, making the invention operate efficiently.

18 Claims, 6 Drawing Sheets

FIG 4
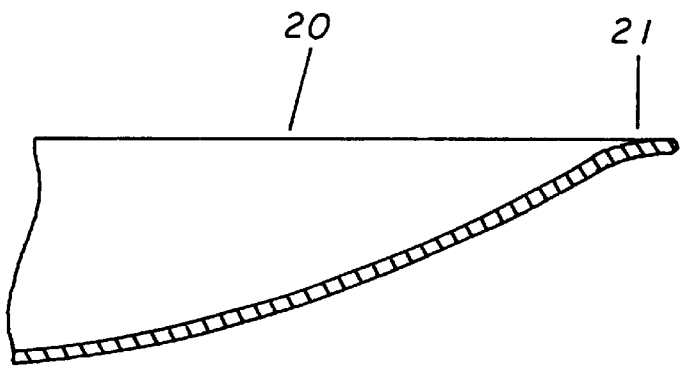
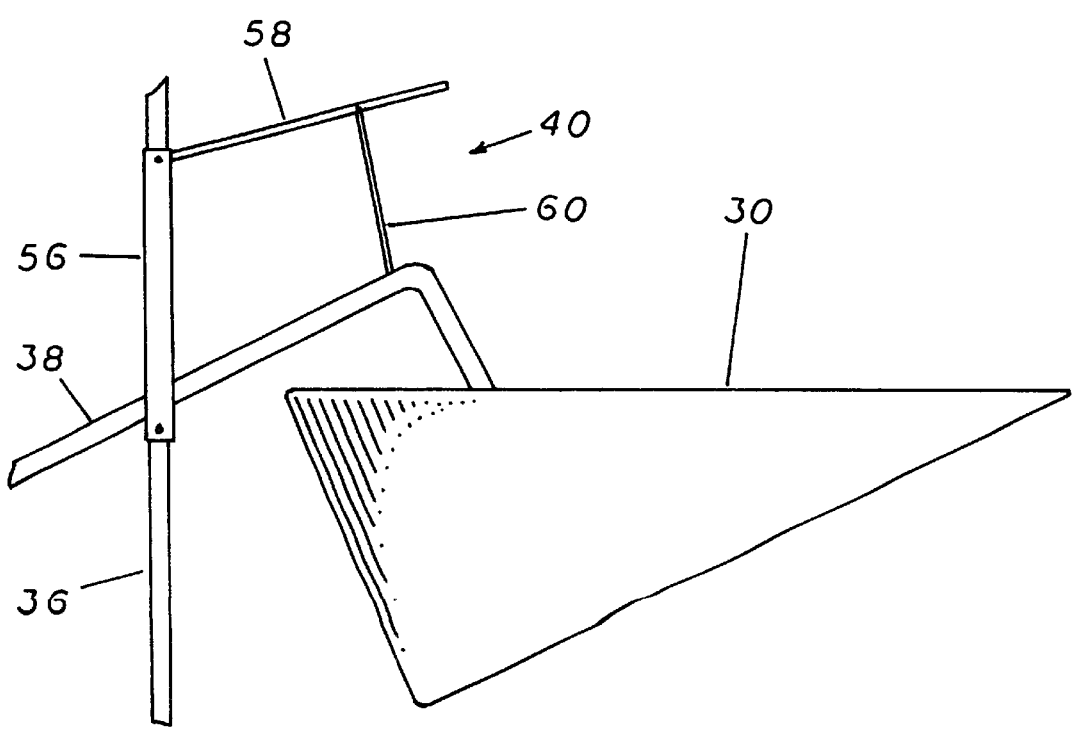
FIG 5

WATER CIRCULATION APPARATUS AND METHOD

This application, in part, claims the benefit of U.S. Provisional Application Serial No. 60/086,285 filed May 21, 1998.

BACKGROUND OF THE INVENTION

The present invention relates to a circulation system for a body of liquid. More specifically, to a floating system for exchanging or displacing water or other liquids from lower levels and delivering them to the upper surface to allow for maximum exposure to the atmosphere.

In order for many bodies of water to develop and maintain a healthy eco-system, a non-specific amount of circulation is typically required. This is because the bacteria necessary for breaking down or digesting nutrients is immobile, and therefore, needs to be placed in intimate contact with nutrients, necessary to thrive, by circulation of the water. Furthermore, in the majority of applications, bacteria also needs oxygen to survive and flourish. The most readily available source of oxygen is from the atmosphere.

Oxygen can enter the water through contact with the atmosphere which may be accelerated through mixing, as happens in nature through waterfalls, streams, rain, and wind. It has been found that adding artificial aeration, to assist nature, to natural and man made ponds and lagoons can greatly increase the health of the ponds. This may be especially useful in sewage lagoons and the like as the decay process could be accelerated and unpleasant smells reduced.

In order to combine the movement of liquid and supplying of the oxygen, past prior art has typically used one of three methods: (1) a surface splashing action (2) an aspirator/boat prop effect which draws atmospheric air in and then forces air bubbles out or (3) compressing atmospheric air and then releasing it at the bottom of the body of liquid. In each of these actions two things are readily apparent (A) high energy input with corresponding high maintenance needs and (B) the action created is always turbulent.

The use of pond aerators on floating bases has been well established such as those shown by U.S. Pat. No. 4,179,243 granted to Aide and U.S. Pat. No. 4,030,859 granted to Henager. In these patents, devices are typically supplied with a draft tube placed just below the surface of the water. This tube houses a propeller or impeller that is connected to a drive means. A draft line is placed at a predetermined depth and connected to the draft tube. Thus, as the drive means turns, the impeller or propeller draws water from a certain depth and defuses it at the water surface. This process circulates and turns the water in the pond. As power to the pump can be a significant issue in remote areas, such as the middle of a pond or lake, the efficiency of the whole unit is crucial to its success. This has required that alternative means of driving the pump on pond mixers would be desirable. One solution has been to use wind power, however wind powered pumps are large in size, expensive, cumbersome, and create a need for complex and expensive anchoring systems.

From this discussion it can be seen that a low energy, circulation method is needed. Such a method or device should be designed to gently circulate (vs. turbulent mixing) a liquid from bottom-to-top with a minimum amount of energy and deliver that liquid to a major oxygen source (the atmosphere) in a manner which will maximize atmospheric absorption. Further it would be advantageous to make such a system so that it can be driven by an inexpensive renewable resource, and thus, able to be used in remote areas with a minimal amount of setup.

SUMMARY OF THE INVENTION

It is the primary objective of the present invention to provide a method of circulating bodies of water in a highly efficient manner that allows for the use of an extremely low horsepower pump.

It is an additional objective of the present invention to provide a method of circulating bodies of water and thus, increase their exposure to the atmosphere through the use of an alternative source of power, such as relatively small solar panels.

It is a further objective of the present invention to combine these characteristics in a small, floating, portable device that can be placed in a desired location and left to circulate a liquid from a lower elevation to the surface.

It is a still further objective of the present invention to provide a method of delivering liquid, through a distribution dish or diffusor, in a non-turbulent manner that will maximize the amount of time the liquid remains on the surface.

These objectives are accomplished by the use of a floating circulation apparatus that has as an on-board power system consisting of a plurality of solar panels that produce the entirety of the power required to drive the water pump. This circulation device is equipped with a water impeller that is larger than, and tightly fitted over, the top of the draft tube through which the water from the pond or reservoir is drawn. By placing the impeller above and out of the draft tube, the efficiency of the pump will be greatly increased. Thus, the same amount of horsepower will move a much larger amount of liquid.

By having the impeller up and out of the draft tube, it is also possible to impart movement to the water in two different ways. First, the impeller moves water by a lifting action which is caused by the rotation of the auger-like impeller. Second, the impeller imparts a rotating motion to the water. This rotating motion will generate centrifugal force, causing even more water movement or mixing. Prior art circulation devices place the impeller down in the draft tube and thus, the rotating motion of the water is wasted as the water is trapped by the walls of the draft tube.

The present invention is also equipped with a large flow distribution or diffuser dish surrounding the impeller. The size and shape of the impeller works to allow the water to move directly away from the impeller, radially. Additionally, the flow diffuser is also equipped with a specially designed outer edge which does not impede the radial flow of water created by the impeller as it passes from the diffuser to the surface of the lake or pond. This allows the present invention to circulate a body of water more effectively, as the motion imparted to the water by the impeller is more efficiently passed outside of the diffuser. Thus, the centrifugal force phenomenon is utilized to create water movement at the surface which in turn operates to circulate the body of water.

For a better understanding of the present invention reference should be made to the drawings and the description in which there are illustrated and described preferred embodiments of the present invention.

DESCRIPTION OF THE DRAWINGS

FIG. 4 is a side elevation, cut-away view of the diffuser lip component of the present invention showing the manner in which it is constructed, so as to not interfere with the flow of water as it passes outside of the diffuser.

FIG. 5 is a side elevation view of the pivoting float component of the present invention illustrating its orientation as it fully supports the weight of the invention while it is in the water.

DESCRIPTION OF THE PREFERRED EMBODIMENT

Figure 1:
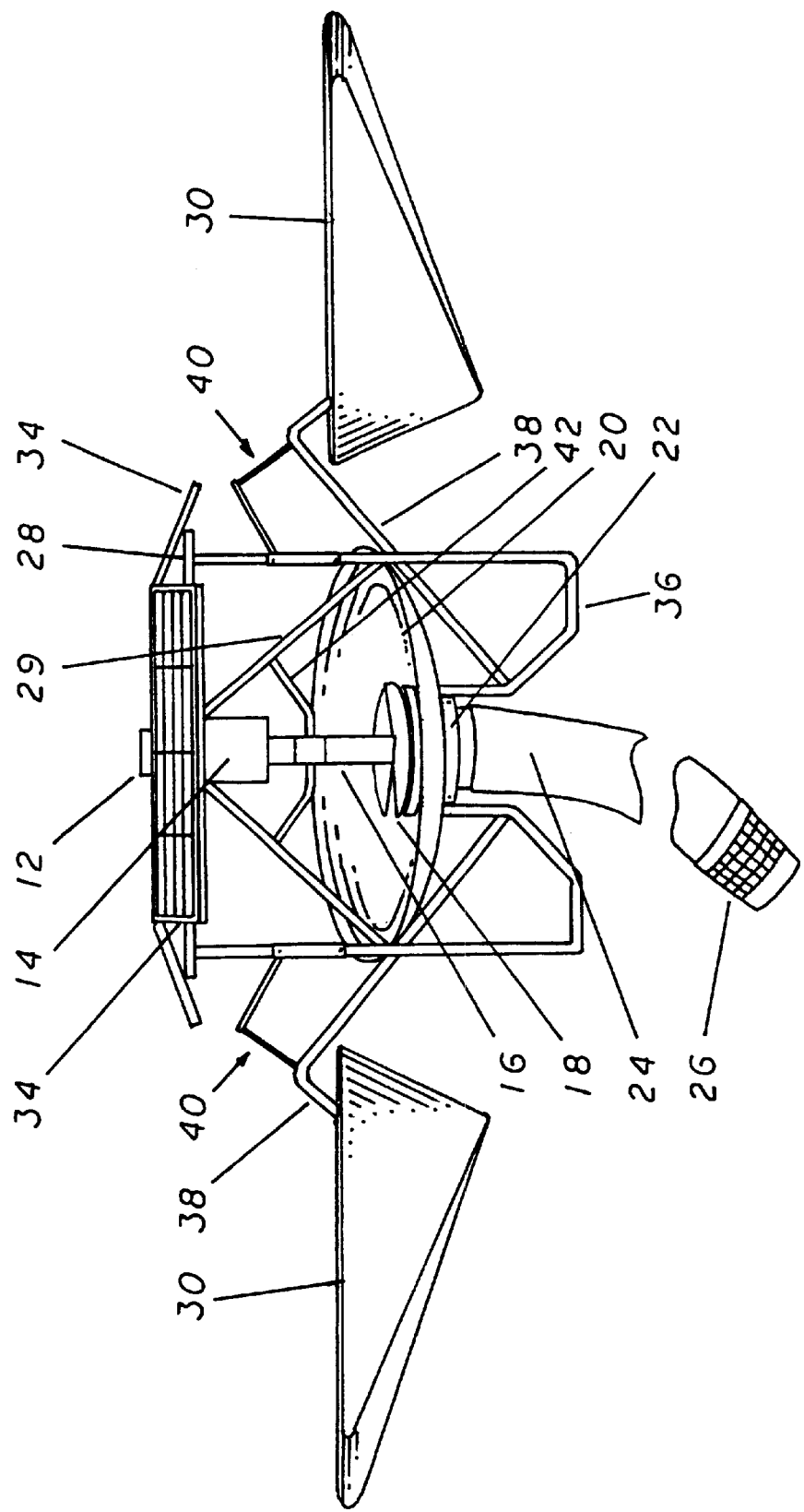
FIG. 1 is a perspective view of the present invention showing the orientation of its major components and the location of the water impeller and the water diffuser in relation to the body of the invention.
Figure 2:
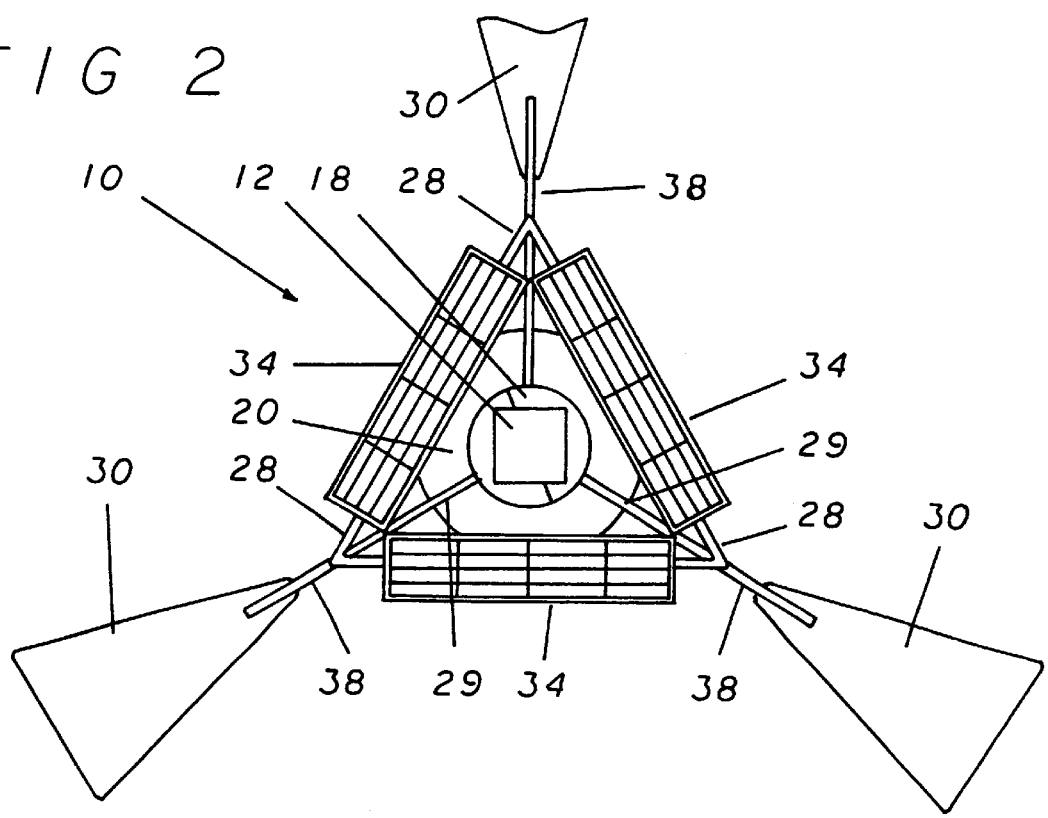
FIG. 2 is a top elevation view of the present invention showing the orientation of the impeller and the diffuser to the solar panels and the floats.

Referring now to the drawings, and more specifically to FIGS. 1 and 2, the floating water circulation apparatus 10 is made up of a triangular frame member 28 which provides the structure to which the other components of the present invention are attached. The triangular frame member 28 has extending in an outwardly manner from each point of the triangle the pivoting float arms 38 which in turn provide the attachment point for the plurality floats 30. These floats 30 are positioned at the outer edge of the triangular frame member 28 which provides a greater degree of stability for the present invention when placed in a body of water and also serves as lever arms to counteract any rotational forces applied to the present invention. The outward location of the floats 30 also serves to keep them from interfering with the flow of the circulated water. The floats 30 are pivotally attached to the lower surface of the pivoting float arms 38 and serve to hold the triangular frame member 28 of the present invention in a horizontal position above the surface of the body of water to be circulated.

The triangular frame member 28 provides for the mounting of the primary components of the present invention at its center. This is accomplished by having a plurality of inner support bars extending inward from the triangular frame member 28 and attaching to the exterior of the impeller shaft housing body 16. This attachment (which will be discussed in further detail below) serves to vertically suspend the impeller shaft housing body 16, and all other components attached to it, within the central portion of the triangular frame member 28. The result of this configuration is that the triangular frame member 28 and the floats 30 work in conjunction to hold the primary components of the present invention in the proper position relative to the body of water.

The primary components of the present invention are all attached to the triangular frame member 28 through the impeller shaft housing body 16. The end of the electric drive motor 12, which supplies the rotational force necessary to pump water, is mounted to the upper most end of the impeller shaft housing body 16. The electric drive motor 12 is equipped with a gear reduction system that allows the electric drive motor 12 to spin at a high RPM, but reduces to a substantially lower RPM at the impeller 18. This allows the use of a relatively low voltage electric drive motor 12 as the lower RPM of the gear reduction system provides sufficient torque at the impeller to rotate it even at slow speeds.

Directly below the electric drive motor 12 on the impeller shaft housing body 16 is the electronic control box 14 which is made up of a sealed box or "potted" to ensure that the electrical components contained within will operate in wet conditions and will continue to control the flow of water through the impeller 18. The electronic control box 14 contains a linear current booster which takes the supplied voltage and amperage and varies their values to match the requirements of the electric drive motor 12. The most common example of this is that the electronic control box 14 will convert excess voltage to amperage, which allows the electric drive motor 12 to run for a longer period of time or at a higher speed on cloudy or hazy days.

The power necessary to run the present invention is supplied by a plurality of solar panels 34 which are mounted along each edge of the triangular frame member 28. The solar panels 34 are each mounted above the upper surface of the triangular frame member 28 at a slight downwardly facing angle of approximately 20 degrees which aids in keeping the face of the solar panels 34 free from debris and rain or heavy dew will have the effect of washing the surfaces clean. Additionally, the triangular orientation of the solar panels 34 ensures that the equivalent of two full panels are always producing power regardless of the present inventions position on the water with respect to the location of the sun. In one embodiment of the present invention, each of the solar panels 34 produces 55 watts of electric power and the electric drive motor 12 requires 110 watts to operate at its maximum capacity. The positioning of the solar panels 34 on the triangular frame member 28 ensures that the electric drive motor 12 will always have enough power to operate in an efficient manner. It must be stated at this point that other sizes of solar panels 34 and electric motor 12 may be used to optimize the current invention for any given size pond.

The triangular frame member 28 of the present invention is also equipped with support legs 36 which extend downward into the body of water. These support legs are also individually attached to the outer most edge of the flow diffuser 20 which helps to secure the flow diffuser 20 in the proper orientation, within the body of the invention. Additionally, the support legs 36 also provide a means of support for the present invention in the event that the body of water is emptied or dries up or for storage purposes.

The impeller shaft housing body 16 extends downward from its point of attachment with the inner support bars 29 to a point just above the water impeller 18. The water impeller 18 is located directly above the upper opening of the draft tube 22. It is important to note that the opening of the draft tube 22 is slightly smaller in diameter than the outside diameter of the water impeller 18. This configuration serves to create a more efficient pump as the larger diameter impeller 18 creates a partial seal over the smaller draft tube 22 opening which does not allow water to recirculate back down into the draft tube 22. This configuration results in a more efficient pumping action. The draft tube 22 is then connected at its lower most end to the draft hose 24 which extends down into the body of water to the desired depth. The lowest end of the draft hose 24 is equipped with a debris strainer 26 which ensures that no unwanted debris will enter and clog the present invention.

As the impeller 18 is rotated by the electric drive motor 12 it draws up water from the bottom of the body of water through the draft hose 24 and draft tube 22. Once the water passes through the water impeller 18 it enters the large bowl shaped flow diffuser 20 which is attached to the upper edge of the draft tube 22 and extends upward and outward therefrom. The flow diffuser captures the water as it leaves the draft tube 22 and gently directs the water, so as not to decrease overall efficiency, directly on to the surface of the water. The result of this is that an outward motion is created on the surface, which then causes induced flow, causing the entire body of water to go into motion.

Figure 3:
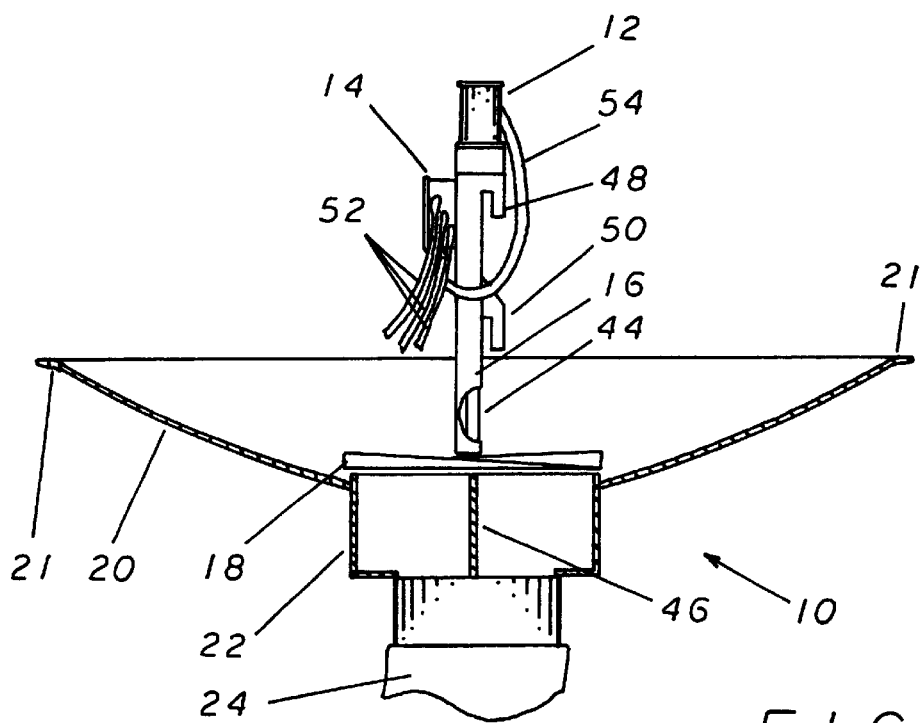
FIG. 3 is a side elevation cut-away view of the internal structure of the present invention showing the manner of construction of the impeller drive freeze sleeve and the draft tube and water flow divider.

Conversely, the rotating motion below the impeller 18 tends to diminish the efficiency of the pumping action. The present invention employs a device to counteract this effect which is illustrated in FIG. 3. The draft tube 22 is equipped with a flow diverter vane 46 which dissects its interior into two equal parts. The flow diverter vane 46 limits the circular flow of water within the draft tube 22 and by this, increases the efficiency of the water impeller 18 as it rotates just above the flow diverter vane 46 with very little clearance between the two. This ensures that most of the energy used to generate motion in the water within the flow diffuser 20 is transferred through the water over the surface of the water being circulated.

Figure 7:
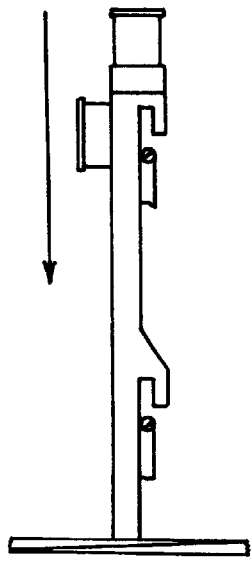
FIG. 7 is a side elevation view of the impeller shaft housing body component of the present invention illustrating the manner in which it is designed that allows it to be quickly and easily removed from and installed on the frame members of the invention.

The construction of the impeller shaft housing body 16 (along with other features of the present invention)is also illustrated in FIG. 3 which shows the location of the impeller drive shaft 44 within the impeller shaft housing body 16. The water impeller 18 is connected directly to the impeller drive shaft 44, not to the impeller shaft housing body 16, and is suspended in a cantilever manner by the impeller drive shaft 44. The connection of the impeller shaft housing body 16 to the triangular frame member 28 of the present invention (which is further detailed in FIG. 7) is accomplished by the use of the upper shaft attachment hook 48 and the lower shaft attachment hook 50 both of which are protrusions from the side of the body of the impeller shaft housing body 16 which have downwardly oriented slot-like openings. It is into these openings that the inner support bars 29, which fit inside of the slot of the upper shaft attachment hook 48, and the lower shaft attachment bars 42, which fit into the slot of the lower shaft attachment hook 50, slip into to hold the entire central assembly of the present invention in place.

Conversely, to remove the impeller shaft housing body 16 (and therefore the impeller 18, the electric motor 12, and the electronic control box 14) one simply lifts up on the impeller shaft housing body 16 until the slots of the upper and lower shaft attachment hooks, 48 and 50, are clear of the inner support bars 29 and the lower shaft attachment arms 42 respectively. This system of attachment for the impeller shaft housing body 16 and all of the components of the invention that are attached to it, allow for easy removal from the body of the invention for service or replacement.

The electronic control box 14, which is mounted to the upper side of the impeller shaft housing body 16, serves to contain all of the electronic controls for the present invention. In this capacity, there are a plurality of control wires that run to and from the electronic control box 14. The first of these are the plurality of panel to control box feed lines 52 which connect the solar panels 34 to the electronic control box 14 and transmit the energy generated in the solar panels 34 to the electronic control box 14. This energy is then processed by the electronic control box 14 and sent to the electric drive motor 12 by use of the box to motor feed wire 54. Thus, the electric drive motor 12 uses energy created by the solar panels 34 to drive the impeller 18, causing the body of water to be circulated.

Figure 8:
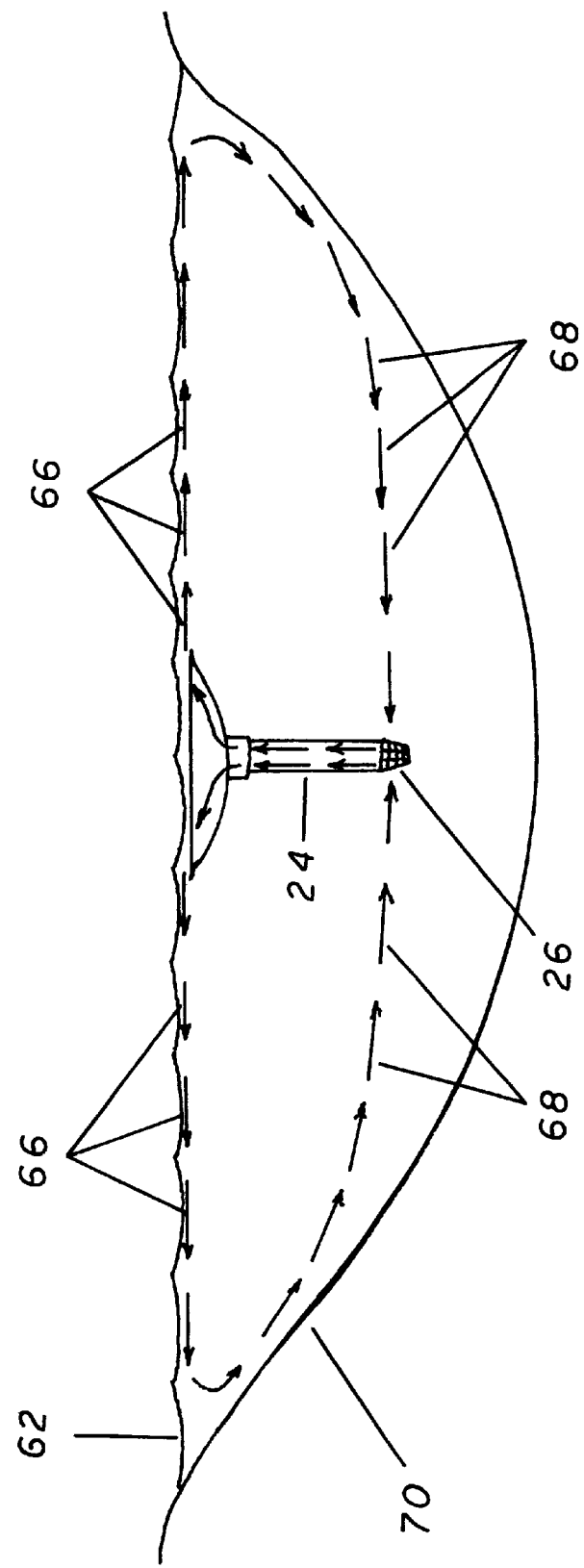
FIG. 8 is a side elevation view of the present invention diagraming the manner in which the water flows in a laminar fashion both from the flow diffuser on the surface of the water and to the draft tube below the surface of the water.

The primary function of the present invention, to circulate the water contained in lakes or ponds, is best illustrated in FIG. 8. As the impeller 18 of the invention rotates, it drives the process which circulates water throughout the body of the pond 70, that eventually allows the water to become oxygenated naturally. This ensures that the body of water will remain in a healthy state by keeping the levels of algae in the proper ratio to the size of the pond 70.

Figure 9:
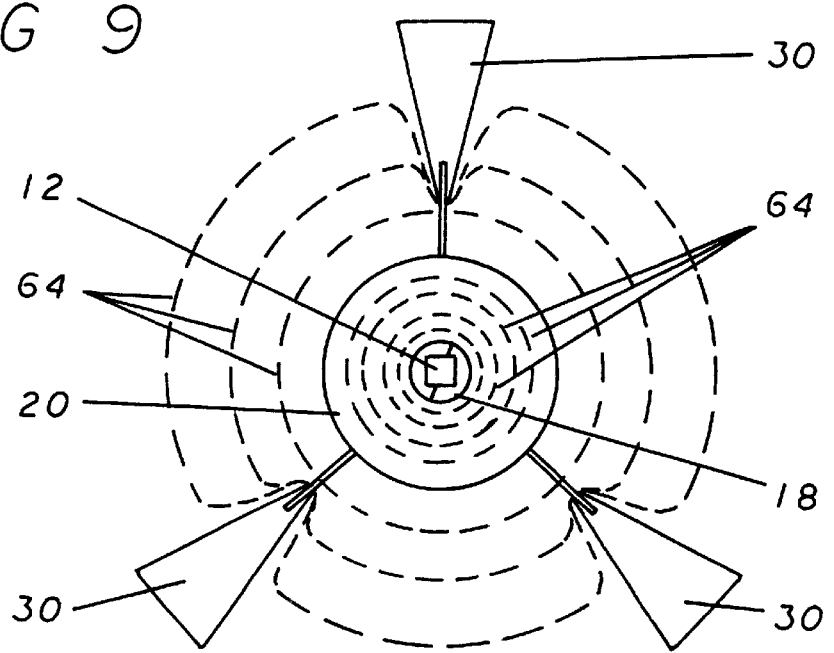
FIG. 9 is a top elevation view of the present invention diagraming the manner in which the water leaves the flow diffuser in concentric circles of laminar flowing water.

The process of oxygenating the water occurs as a result of a plurality of events occurring at the same time. The first of these is that the rotation of the impeller 18 forces water out of the flow diffuser 20 over the laminar flow diffuser lip 21 creating the surface laminar flow 66. The surface laminar flow 66 is a very thin layer of water flowing on the surface at a very low velocity. Additionally, the surface laminar flow 66 occurs in a radial manner from the invention (an occurrence that is best illustrated in the diagram in FIG. 9) which ensures that it will eventually extend to all portions of the surface of the pond 70.

While the surface laminar flow 66 is being forced out of the present invention at the surface of the pond 70, an additional layer of water is being drawn into the draft hose 24 through the strainer 26 below the surface of the pond 70. This layer of water, which acts in much the same manner as the surface laminar flow 66, is called the under water laminar flow 68 and it is the water that is drawn up the draft hose 24 to be re-circulated by the impeller 18. The under water laminar flow 68 is a very thin layer of water that is flowing at a very low velocity. Finally, as the draft hose 24 draws this layer of water equally from all portions of the pond 70, the water is moving towards the draft hose 24 in a radial manner, which ensures that all the water in the pond 70 is involved in the circulation process.

The action of the surface laminar flow 66 and the under water laminar flow 68 creates an induced flow in the rest of the water contained in the pond 70. The induced flow means that as water molecules that are contained within the surface and under water laminar flows, 66 and 68, move away from or towards the present invention, they are replaced by other water molecules contained in the body of the pond 70. This action causes all of the water to eventually be drawn into the circulating action driven by the impeller 18 of the invention. The result of this is that over time, all of the water in the pond 70 will reach the surface where it will come into contact with the atmosphere. Once the water contacts the atmosphere, it will absorb oxygen naturally, thus, oxygenating the entire pond 70.

Figure 10:
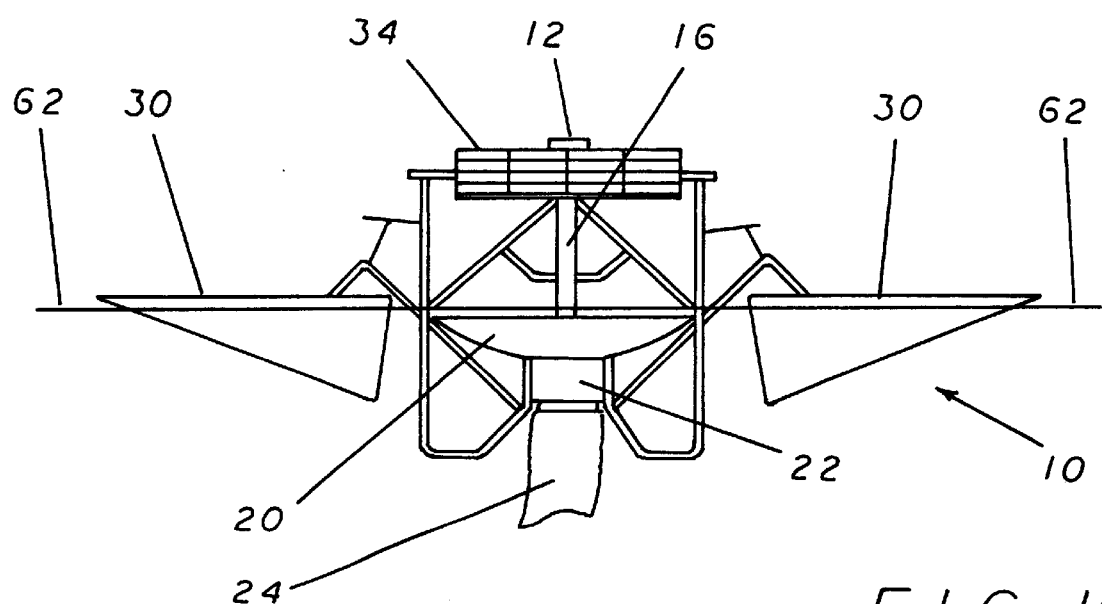
FIG. 10 is a side elevation view of the present invention illustrating the positioning of the flow diffuser just below the surface of the water when the invention is in use.

The water dispersion and circulation function of the present invention is also enhanced by the use of the laminar flow diffuser lip 21 which forms the outermost edge of the flow diffuser 20 and which is further detailed in FIG. 4. The laminar flow diffuser lip 21 functions to lessen the difference between the water within the flow diffuser 20 and the water outside of it. This is accomplished by constructing a lip that is different than the body of the flow diffuser 20. Additionally, the body of the flow diffuser 20 sits below the water line 62 when the present invention is placed in a lake or pond 70 which is illustrated in FIG. 10. This relative position of the flow diffuser 20 in relation to the water line 62 further enhances the function of the laminar flow diffuser lip 21 as it allows waves of water moving outward from the impeller 18 to pass freely between the laminar flow diffuser lip 21 and the water line 62.

Therefore, as water passes from the interior of the flow diffuser 20 to open water, the laminar flow diffuser lip 21 interacts with it as little as possible so that the motion imparted upon the water by the impeller 18 is not disrupted by the passing from the body of the diffuser 20 to the open water, which allows the present invention to operate at maximum efficiency. This function of the laminar flow diffuser lip 21 is further illustrated in FIG. 9 which clearly shows how the concentric waves 64 created by the rotation of the impeller 18 pass freely from the body of the flow diffuser 20 to the open water of the lake or pond. These features of the present invention ensure that the maximum amount of water possible is circulated by the rotation of the impeller 18.

Figure 6:
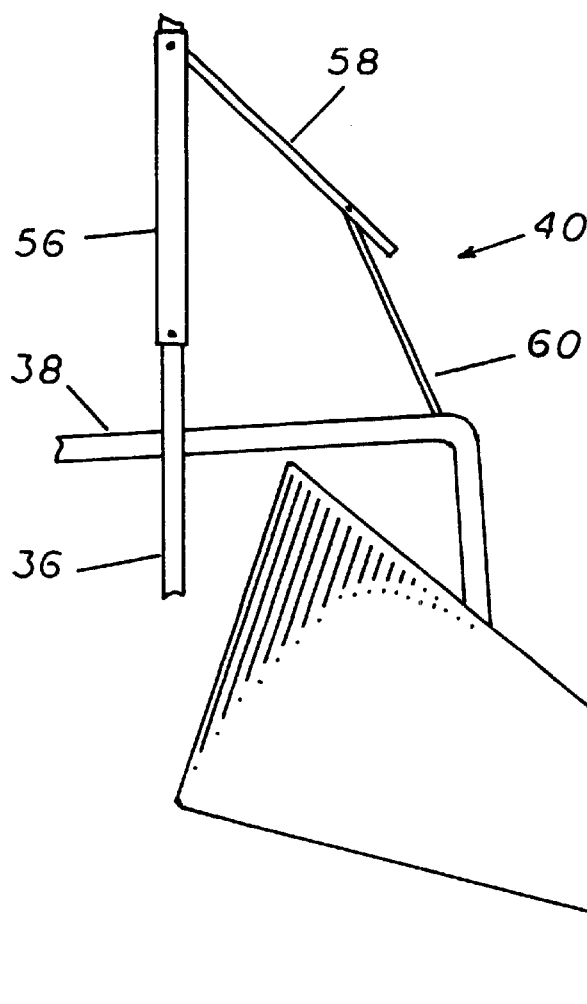
FIG. 6 is a side elevation view of the pivoting float component of the present invention illustrating its orientation when the body of the invention is out of the water and the floats are not used to support its weight.

The floats 30 and float support apparatuses of the present invention are constructed in a manner that allows the floats 30 to pivot in regards to the central body of the invention and this mechanism is illustrated in FIGS. 5 and 6. The float 30 itself is pivotally attached at its most inward end (in relation to the body of the invention) to the most outward end of the pivoting float arm 38 which is in turn pivotally attached at its most inward end to the inner sections of the support legs 36 of the invention. Additionally, at the point of attachment of the floats 30 to the pivoting float arms 38, the pivoting float arms 38 are formed into a downwardly oriented ninety degree bend. The purpose of this bend is that it allows the float 30 to pivot freely without any interference from the body of the pivoting float arm 38.

The floats 30 and the pivoting float arms 38 are also equipped with a pivoting float arm support 40 which helps to keep the floats 30 in the proper position in relation to the body of the invention. The pivoting float arm supports 40 are made up of three components and span the distance between the outer portion of the support legs 36 and the most outward end of the pivoting float arm 38. The portion of the pivoting float arms 38 that are attached to the support legs 36 are called the float arm support attachment bars 56, they extend along a portion of the outer edge of the support legs 36 above the level that the floats 30 rest when they are in their upward position. The uppermost end of these float arm support attachment bars 56 have pivotally attached to them the upper pivoting float support bars 58 which extend outward from this point of attachment. Finally, the upper pivoting float support bars 58 have pivotally attached to them towards their outer ends the lower pivoting float support bars 60 which extend downward to the point where they are pivotally attached to the upper edge of the pivoting float arm 38.

The function of the pivoting float arm support 40 is best shown in the differences between the illustrations in FIG. 5 and FIG. 6. In FIG. 5 the floats 30 are in an upward position which most commonly occurs when the present invention is in the water and the floats 30 are supporting its entire weight. Conversely, when the invention is out of the water for storage the floats 30 drop down as illustrated in FIG. 6. The pivoting float arm supports 40 help to guide the pivoting float arm 38 through this pivoting motion and ensure that the floats 30 remain in the correct orientation in relation to the body of the invention.

Although the present invention has been described in considerable detail with reference to certain preferred versions thereof, other versions are possible. Therefore, the spirit and scope of the appended claims should not be limited to the description of the preferred versions contained herein.

What is claimed is:

1. A distribution dish for circulating liquid from lower levels to the upper surface of a body of liquid, said distribution dish having a drive system to move the liquid through said distribution dish so as to evenly distribute said liquid about the upper surface of said body of water, said distribution dish comprising:

a circular dish placed just below the upper surface of said body of liquid said dish having outer walls with an upper edge and a lower edge, said outer walls tapering down and inward from said upper edge to said lower edge in a substantially parabolic fashion so as to define an upper opening and a lower opening, said lower opening having an area substantially less that of said upper opening;

an upper horizontal lip defined by said circular dishes upper edge, said upper lip being substantially parallel to said upper surface of said body of liquid;

a draft tube extending downward from said lower opening of said distribution dish; and a vertical plate fixedly attached inside of said draft tube, said vertical plate being substantially perpendicular to said upper surface of said liquid.

2. A distribution dish as in claim 1 wherein said draft tube is orientated substantially perpendicular to said upper surface of said body of liquid.

3. A distribution dish as in claim 2 further comprising a floating framework for supporting said circular dish.

4. A distribution dish as in claim 3 wherein said vertical plate divides said draft tube into at least two sections.

5. A liquid circulation apparatus for moving liquid from the lower levels of a body of liquid to the upper surface of said body of liquid said liquid circulation apparatus comprising:

a floating framework;

a funnel shaped circular dish, said dish having outer walls with an upper edge and a lower edge, said outer walls tapering down and inward from said upper edge to said lower edge so as to define an upper opening and a lower opening said lower opening having an area substantially less that of said upper opening;

an upper horizontal lip defined by said circular dish's upper edge, said upper lip being substantially parallel to said upper surface of said body of liquid;

an impeller mounted in a horizontal position above said lower opening of said circular dish, said impeller having a diameter at least as great as the diameter of said lower opening;

a floating frame section mounted about said circular dish such that said circular dish is properly positioned within said body of liquid;

a draft tube extending downward from said lower opening of said distribution dish; and a vertical plate fixedly attached inside of said draft tube, said vertical plate being substantially perpendicular to said upper surface of said liquid.

6. A liquid circulation apparatus as in claim 5 further comprising a plurality of float section attached to said frame section, said float sections adjusted so as to hold said circular dish in a position just below the surface of said body of liquid.

7. A liquid circulation apparatus as in claim 6 further comprising an electric drive means for rotating said impeller.

8. A liquid circulation apparatus as in claim 7 further comprising a plurality of solar panels for powering said electric drive means said solar panels being fixedly attached to said frame section.

9. A liquid circulation apparatus as in claim 8 wherein said electric drive means and said impeller are removably attached to said frame section as a single unit.

10. A liquid circulation apparatus as in claim 9 further comprising a strainer section attached to said draft tube.

11. A method of creating a circulating flow in a open body of liquid having an upper surface and lower levels said method comprising the steps of:

A. Placing a circular dish attached to a framework so that said circular dish is placed just below the upper surface of said open body of liquid, said dish having outer walls with an upper edge and a lower edge, said outer walls tapering down and inward from said upper edge to said lower edge so as to define an upper opening and a lower opening, said lower opening having an area substantially less that of said upper opening;

B. Drawing liquid from lower levels of said body of liquid to a point near the surface through a draft tube extending downward from said lower opening of said distribution dish said draft tube having a vertical plate fixedly attached inside of said draft tube, said vertical plate being substantially perpendicular to said upper surface of said open body of liquid;

C. Changing the flow direction of said liquid;

D. Distributing said liquid from said lower levels in a 360 degree manner about said circular dish;

E. Creating an outwardly expanding laminar flow of water from said distribution; and F. Repeating steps A to E so as to start the water turning in a circular fashion spreading out in all horizontal directions from said liquid circulation apparatus in a given body of liquid.

12. A method of creating a circulating flow in a body of liquid as in claim 11 further comprising the step of:

A1. Powering said liquid circulation apparatus through the use of a plurality of solar panels.

13. A method of creating a circulating flow in a body of liquid as in claim 12 wherein said circular dish has an upper horizontal lip defined by said circular dishes upper edge, said upper lip being substantially parallel to said upper surface of said body of liquid.

14. A method of creating a circulating flow in a body of liquid as in claim 13 further comprising the step of:

D1: anchoring said circular dish in said open body of liquid.

15. A method of creating a circulating flow in a body of liquid having an upper surface and lower levels said method comprising the steps of:

A. Placing a floating liquid circulation apparatus in said body of water;

B. Drawing liquid from lower levels of said body of liquid through a draft tube extending downward from said floating liquid circulation apparatus said draft tube having a vertical plate fixedly attached inside of said draft tube, said vertical plate being substantially perpendicular to said upper surface of said body of liquid to a point near the surface inside of a circular distribution dish on said liquid circulation apparatus;

C. Supplying said distribution dish with an outer horizontal lip;

D. Distributing said water from said lower levels in a 360 degree manner over said horizontal lip;

E. Creating an outwardly expanding laminar flow of water from said distribution; and F. Repeating steps B to E so as to start the water turning in a circular fashion spreading out in all horizontal directions from said liquid circulation apparatus in a given body of liquid.

16. A method of creating a circulating flow in a body of liquid as in claim 15 further comprising the step of:

A1. Providing said circulation apparatus with an impeller and drive system for said impeller.

17. A method of creating a circulating flow in a body of liquid as in claim 16 further comprising the step of:

A2. Powering said drive system through a plurality of solar panels.

18. A method of creating a circulating flow in a body of liquid as in claim 17 further comprising the step of:

A3. Anchoring said circulation apparatus in a central location in said body of liquid.

* * * * *